US006634666B2

United States Patent
Shilitz et al.

(10) Patent No.: US 6,634,666 B2
(45) Date of Patent: Oct. 21, 2003

(54) REMOTE CONTROL TOWING-HITCH ASSEMBLY

(76) Inventors: David Shilitz, 8824 Division La., Baltimore, MD (US) 21208; David M. Hill, 37 Ridgemoor Rd., Baltimore, MD (US) 21221; Louis Toth, 3220 Regents Row, West Friendship, MD (US) 21794

( * ) Notice: Subject to any disclaimer, the term of this patent is extended or adjusted under 35 U.S.C. 154(b) by 0 days.

(21) Appl. No.: 10/005,476

(22) Filed: Dec. 4, 2001

(65) Prior Publication Data

US 2002/0089147 A1 Jul. 11, 2002

Related U.S. Application Data

(60) Provisional application No. 60/262,348, filed on Jan. 18, 2001, and provisional application No. 60/251,187, filed on Dec. 5, 2000.

(51) Int. Cl.[7] .................................................. B60D 1/44
(52) U.S. Cl. ..................................... 280/470; 280/479.1
(58) Field of Search .............................. 280/407, 438.1, 280/447, 467–470, 472, 479.1, 511

(56) References Cited

U.S. PATENT DOCUMENTS

| | | | | |
|---|---|---|---|---|
| 2,917,323 A | * | 12/1959 | Mandekic | |
| 3,178,203 A | * | 4/1965 | Elliott | |
| 3,891,239 A | * | 6/1975 | Leo et al. | 280/490 |
| 3,922,007 A | * | 11/1975 | Friedebach | 280/447 |
| 4,153,132 A | * | 5/1979 | Biedebach | 280/468 |
| 4,214,772 A | * | 7/1980 | Carr et al. | 280/470 |
| 6,220,618 B1 | * | 4/2001 | Smith et al. | 280/447 |
| 6,325,588 B1 | * | 12/2001 | Nolin | 414/526 |
| 6,349,793 B1 | * | 2/2002 | Kincaid | 182/141 |

FOREIGN PATENT DOCUMENTS

DE      812227      * 6/1951 ................. 280/470

* cited by examiner

*Primary Examiner*—Anne Marie Boehler
(74) *Attorney, Agent, or Firm*—Law Offices of Royal W. Craig (57) ABSTRACT

An adjustable trailer hitch which provides an operator improved remote control of the lateral position of a trailer hitch, and simplifies the procedure of hooking a trailer to a tow vehicle. The trailer hitch comprises a hitch assembly (such as a ball receptacle) attached to a roller carriage which moves from side-to-side along a bumper-like housing. The roller carriage engages a positioning screw, and an electric motor mounted in a sealed end cap powers the positioning screw. Rotation of the screw translates into rightward or leftward lateral movement of the roller carriage and consequently of the ball receptacle assembly. Motion of the ball receptacle assembly is controlled via a wireless remote control unit. Such direct control over the precise lateral position of the trailer hitch enables the operator to accurately steer the trailer when traveling in reverse. During hook-up, lateral movement of the hitch enables the operator to connect the trailer and the tow vehicle from a greater range of positions, and eliminates the need for absolute accuracy of alignment between the tongue of the trailer and the hitch of the tow vehicle as required by traditional fixed hitches.

17 Claims, 8 Drawing Sheets

Fig. 14

REMOTE CONTROL TOWING-HITCH ASSEMBLY

CROSS-REFERENCE TO RELATED APPLICATIONS

The present application derives priority from U.S. provisional application Nos. 60/251,187 for REMOTE CONTROL TOWING-HITCH ASSEMBLY"; Filed: Dec. 5, 2000, and 60/262,348 for REMOTE CONTROL TOWING-HITCH ASSEMBLY AND ATTACHMENT DEVICE"; Filed: Jan. 18, 2001.

BACKGROUND OF THE INVENTION

1. Field of the Invention

The present invention relates to trailer hitches and, more particularly, to an articulating trailer hitch with remote control mechanism to allow the user to compensate for misalignment of the hitch and trailer tongue during hook-up.

2. Description of the Background

There has been a sharp increase in driver preference for sport utility vehicles and pick-up trucks over the past decade, and this is partly due an increased demand for more powerful towing capabilities. Such tow vehicles are commonly used to pull trailers for boats, other cars, water-craft, landscaping and lawn-care machinery, livestock, as well as campers, moving trailers, and general purpose trailers. The general increase in towing has sensitized consumers to the hardships which arise from the use of a traditional fixed trailer hitches.

There is often great difficulty in hooking a trailer to a tow vehicle equipped with a fixed tow hitch because the tow vehicle and the trailer must be precisely aligned to make the proper connection. The difficulty is exacerbated by the fact that the view of the trailer hitch and trailer tongue are usually obscured from the driver's view by the rear of the vehicle. Therefore, hook-up is often a two-person operation, carried out with the first person operating the vehicle and the second person, positioned at the rear of the vehicle with a clear view of the hitch and the trailer, shouting or signaling directional commands to the vehicle operator. This two-person approach is, however, prone to error as it is difficult enough for the to rear person to communicate the exact degree of the amount of leftward or rightward adjustment required, let alone for the driver to execute precisely. The result is most often over- or under-shoot, which forces the driver to pull forward and begin the alignment process anew. On an incline, such as a boat ramp, this procedure can be time consuming and hazardous.

Even after they are connected the vehicle/trailer tandem is difficult to maneuver, particularly when backing the trailer. The operator must turn the steering wheel of the tow vehicle in the direction opposite the desired direction of the trailer. Trying to make a tight turn in reverse can result in a "jack-knife", wherein the tongue of the trailer ends up parallel to the bumper of the tow vehicle, making further backward movement impossible. Even backwards travel in a straight line can be difficult, as for example, when backing a trailer down a narrow boat ramp. In forward travel, tight turns are also difficult to negotiate, because the trailer wheels track inside of the arc taken by the wheels of the tow vehicle. In other words, the tow vehicle makes a "wider" turn than the trailer or conversely the trailer makes a "tighter" turn than the tow vehicle. Maneuverability problems are worst in small areas where the movements of the towing vehicle are restricted and the handling capabilities are diminished.

There have been efforts as far back as the turn of the century to improve trailer hitches by incorporating lateral movement capabilities into their design. For example, U.S. Pat. No. 1,162,949 to Olson shows a primitive example of a trailer hitch comprising a screw-shaft connected to a bevel gear assembly which enables the operator to laterally adjust the hitch from the operator's seat of the tow vehicle or tractor.

In addition, U.S. Pat. No. 1,221,086 to Olson discloses a further refinement to the laterally adjustable trailer hitch, wherein a steering mechanism connected to the front axle of the tow vehicle enables the operator to steer the trailer for improved maneuverability.

U.S. Pat. Nos. 1,235,082 to Von Brethorst, 1,450,526 to Timmis, and 2,917,323 to Mandekic further show simple mechanically activated mechanisms employing a horizontally disposed screw-shaft to achieve lateral movement of the trailer hitch.

An improvement to the mechanical devices referenced above is taught in U.S. Pat. No. 3,178,203 to Elliott. Shown is a trailer steering mechanism for the improved steering of a trailer accomplished by incorporating a threaded shaft into the attachment mechanism between the tow vehicle and trailer. In addition, Elliott '203 teaches the use of an electric motor to power the threaded shaft. Operation of the motor is controlled from the cab of the truck by an electrical circuit.

Lacking in the prior art, however, is a device powered by an electric motor working through a positioning screw for wide degree of motion, an assembly of ratio gears for robust yet precise adjustment, or operable by a wireless remote control device from the cab or rear of the vehicle. Further, none of the references cited incorporate the screw shaft and its attendant components in an enclosed, protective housing which increases the useful life of the trailer hitch and offers a compact, clean design to satisfy appearance conscious consumers. In light of the foregoing, it would be of great advantage to create an improved adjustable trailer hitch which incorporates these and other advanced features, and which enables the operator of the tow vehicle to laterally adjust the position of the ball receptacle assembly to simplify hook-up and to enhance maneuverability.

SUMMARY OF THE INVENTION

It is, therefore, an object of the present invention to provide a system for lateral adjustment of the ball receptacle assembly of a trailer hitch by linking said ball receptacle assembly to a motor driven positioning screw.

It is another object to enclose the positioning screw, electric motor, remote sensing unit, and all other internal operating components (to be fully described below) in a sealed housing to protect said components from wear caused by exposure, and to enhance the aesthetic appeal of the device.

It is yet another object of the present invention to control the lateral movement of the ball receptacle assembly by a wireless remote control unit.

A still further object of the invention is to mount the hitch to the rear of a towing vehicle by means of mounting brackets adaptable for use on a range of different tow vehicles.

According to the present invention, the above-described and other objects are accomplished by providing a trailer hitch with a laterally adjustable ball receptacle assembly. The ball receptacle assembly includes a motor driven positioning screw. The motor is powered by a 12-volt direct current electrical system and turns the positioning screw via a linkage comprised of ratio gears or through a coupling directly to the shaft. The ball receptacle assembly is mounted beneath a roller guide comprising a threaded transverse channel which engages the positioning screw. Clockwise rotation of the positioning screw causes the roller guide to move laterally rightward. Conversely, counter-clockwise rotation causes the roller guide to move laterally leftward. The roller guide carries the attached ball receptacle assembly through the course of its lateral movement. Lateral adjustment of the hitch eliminates the need for the lateral element of precision during hook-up, leaving the operator responsible only for the more easily addressed forward and rearward positioning of the vehicle to achieve proper alignment of the trailer and hitch. Further, the invention simplifies backing the vehicle/trailer tandem because the remote control device enables the operator to make fine tuning adjustments to the position of the hitch from within the cab of the tow vehicle. Finally, in forward travel, the invention improves maneuverability as lateral adjustment of the hitch while the vehicle/trailer tandem is in motion can be used to cause the trailer to track in the same arc as the turning tow vehicle. For example, when making a tight right turn, a rightward movement of hitch (as viewed from behind) causes the trailer to track out a wider arc through the turn than if no adjustment were made.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Figure 1:
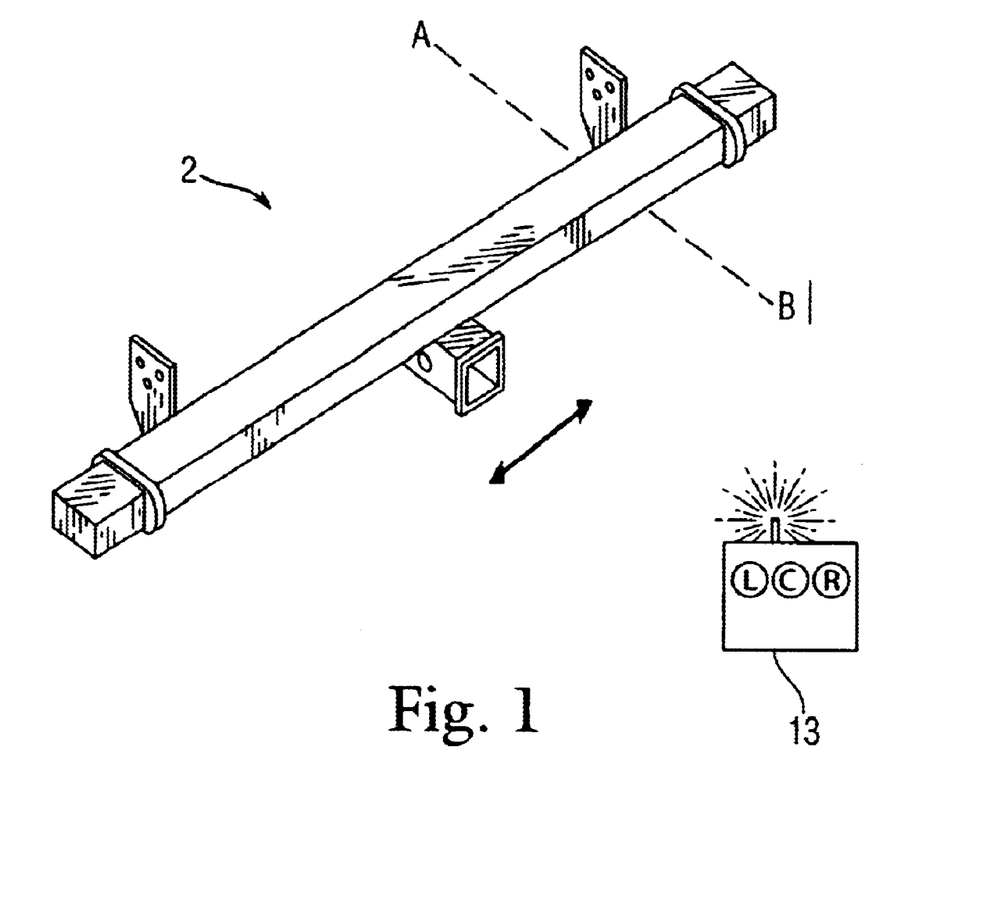
FIG. 1 is an isometric view of the assembled trailer hitch assembly.

FIG. 1 is a perspective view of the trailer hitch assembly 2 of the present invention which incorporates a remote control mechanism 13 to facilitate the left and right lateral movement of the hitch's ball receptacle assembly. As an alternative to the remote control mechanism 13, a control panel hard can be wired to the trailer hitch assembly 2, the latter being accessible from within the cab of the tow vehicle to enable the operator to control the lateral movement of the hitch's ball receptacle assembly. Such lateral movement enhances steering capabilities of the trailer when backing-up, and compensates for misalignment of the hitch and trailer tongue during hook-up. As can be seen in FIG. 1, the internal configuration of the trailer hitch assembly 2 allows it to be contained within a housing that gives it the same outward appearance as a conventional trailer hitch.

Figure 2:
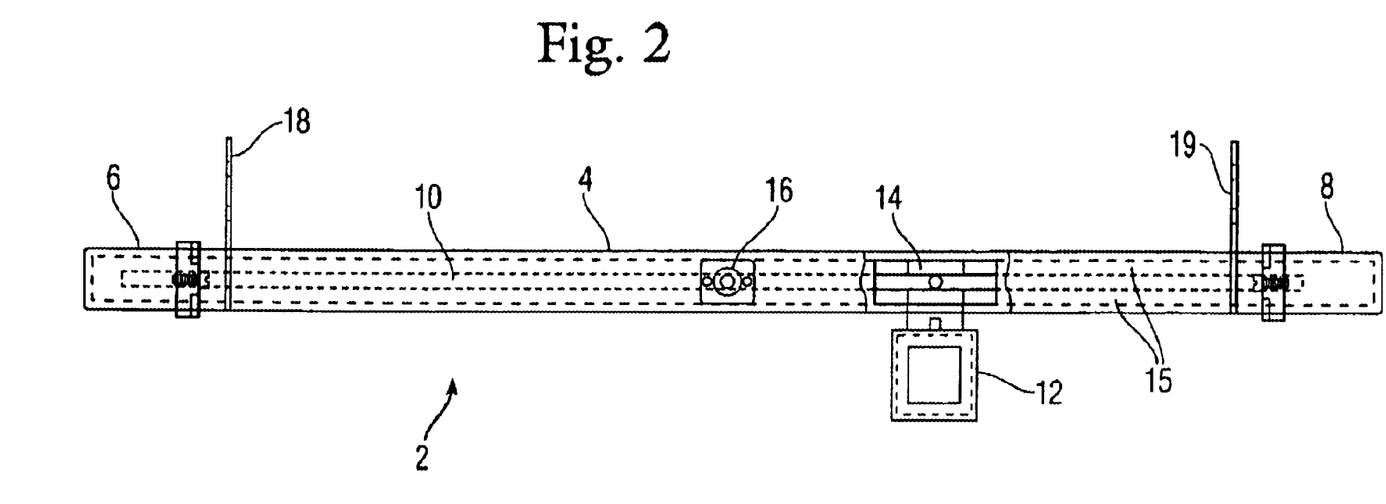
FIG. 2 is a cross-sectional view of the fully assembled trailer hitch.
Figure 9:
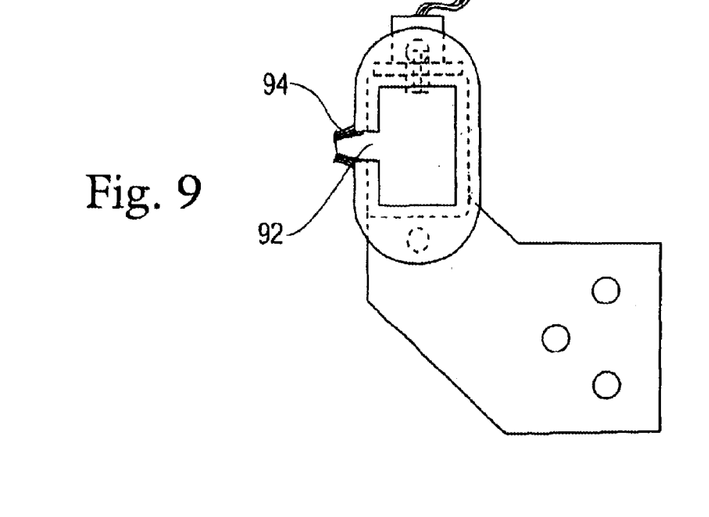
FIG. 9 is a cross-sectional view of the main housing assembly with the ball receptacle assembly and roller guide removed.

As seen in the cross-sectional view of FIG. 2, the trailer hitch 2 comprises an elongate housing structure divided into a central chamber 4 flanked by end-caps 6, 8. One of the end caps 6 forms a sealed housing for a bushing (or bearings) which seat the distal end of an elongate positioning screw 10. The opposite end cap 8 forms a sealed housing for an electric motor which drives the positioning screw 10. The positioning screw 10 lies horizontally within the central chamber between the bearing shaft and the drive motor. The positioning screw 10 drives a ball receptacle assembly 12 laterally along the outside of central chamber 4. The central chamber 4 is defined by a slotted opening 92 that stretches lengthwise along its downwardly disposed face (also see FIG. 9). With further reference to FIG. 9, a dust cover 94 comprising a plurality of bristles is installed along the edge of the slotted opening 92 to protect the components within the central chamber. Referring back to FIG. 2, the external ball receptacle assembly 12 is connected to an internal roller guide carriage 14 projecting through the slotted opening 92. The roller guide carriage 14 moves laterally along a horizontally disposed track 15 within the central chamber 4. A center position lock assembly 16 is attached at the midpoint of the rear face of the central chamber 4. Mounting brackets 18, 19 enable the trailer hitch to attach to the frame of a tow vehicle. It will be readily understood by those skilled in the art that the orientation of the slotted opening 92, internal roller guide carriage 14 and associated features may be varied without deviating from present invention. For example, the slotted opening 92 may be located along the outer side of the housing, with internal roller guide carriage 14 projecting horizontally and rearwardly through the slotted opening 92. These alternative orientations are considered to be within the scope and spirit of the present invention.

Figure 3:
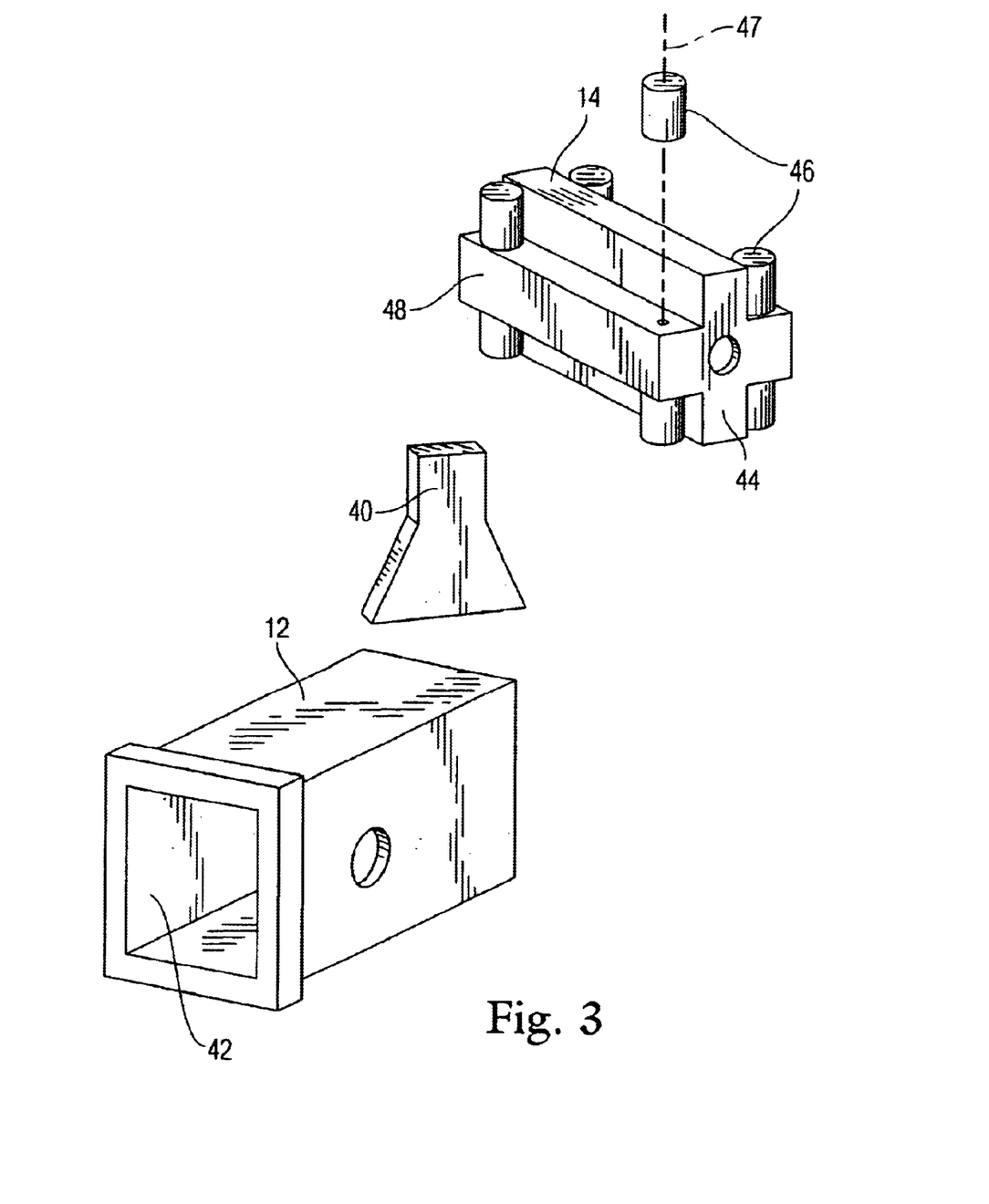
FIG. 3 is a composite front and side cross-sectional view of the ball receptacle assembly and roller guide.

As best seen in FIG. 3, the roller guide 14 and ball receptacle assembly 12 are attached by a bracket 40. The ball receptacle assembly 12 comprises a square socket 42 having a 2" inside dimension, capable of accommodating a standard 2"×2" hitch tongue. The bracket 40 is welded to the top surface of the ball receptacle assembly 12 and to the bottom face of the roller guide 14. Alternatively, the socket 42, bracket 40, and roller guide 14 may be a single cast steel member. The roller guide 14 comprises a carbon steel carriage body 48 having the shape of a three-dimensional cross, and carries a centrally disposed transverse channel 44. The transverse channel 44 is threaded and engages the positioning screw 10 as shown in FIG. 2. The roller guide 14 rides on the positioning screw 10 as the positioning screw 10 turns. The roller guide 14 further comprises pairs of stainless steel wheels 46 which are mounted at the corners of the carriage body 48. Four pairs of wheels 46 are thereby attached to the carriage body 48. Pins 47 centrally disposed within each steel wheel 46 function as axles for the wheel assemblies.

Figure 4:
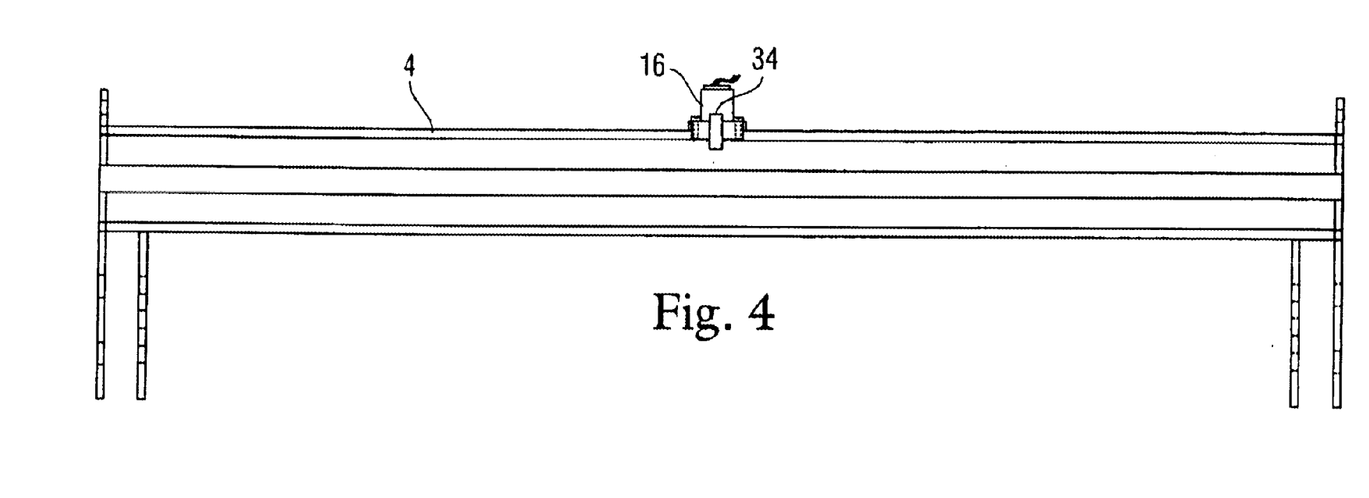
FIG. 4 is a top plan view of the fully assembled trailer hitch showing the rearward placement of the center positioning lock assembly.

The center position lock assembly 16 visible in FIG. 4 is mounted to the rear face of the central chamber 4 and locks the ball receptacle assembly 12 in the center position. The locking mechanism prevents lateral movement of the hitch assembly during transport. The center position lock assembly 16 comprises a lock which is retracted using an electromagnet and a spring loaded pin to lock when the electromagnet is not energized. In the center position, the electromagnet of the center position lock assembly is de-energized which locks the ball receptacle assembly 12 thereby preventing lateral movement.

Figures 5, 6, 7, 8:
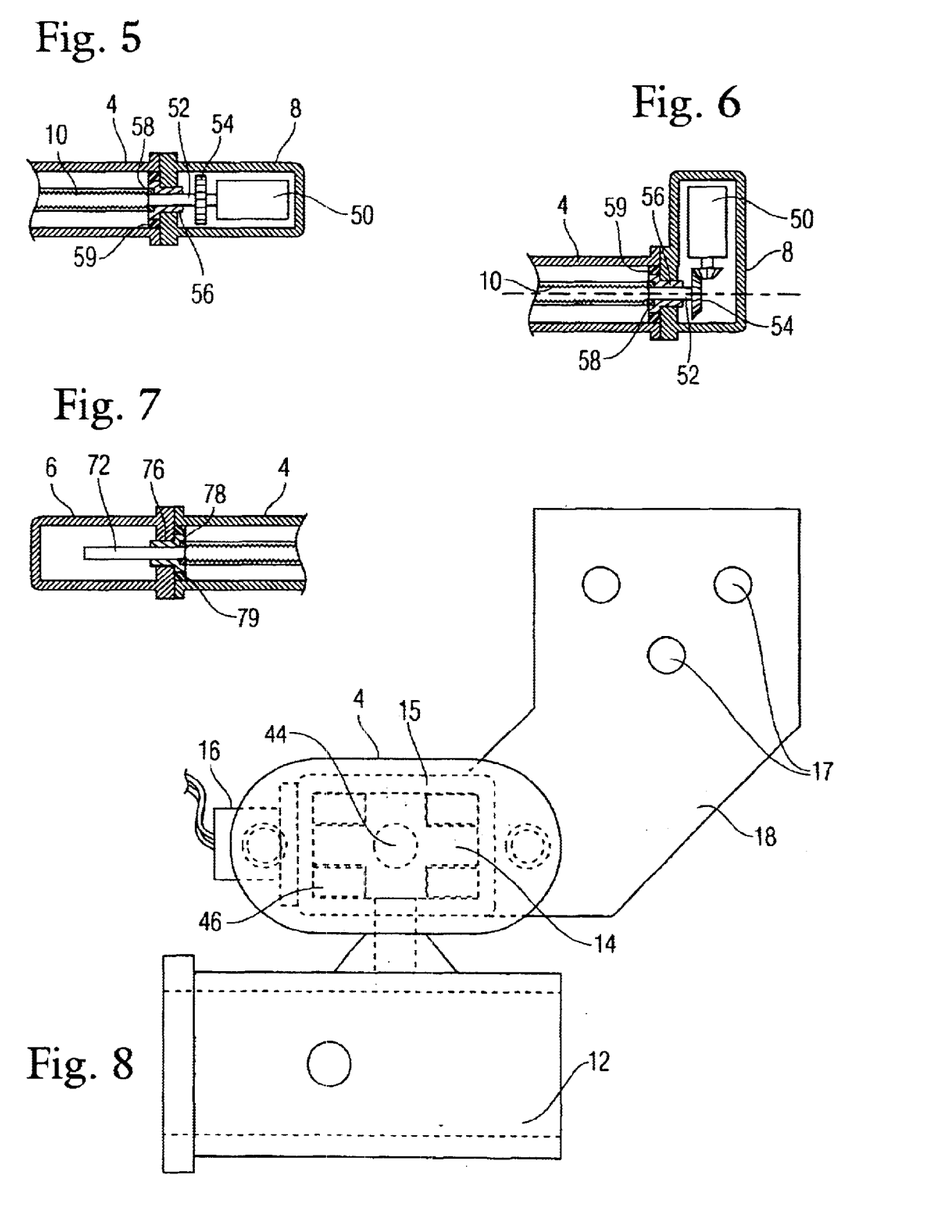
FIG. 5 is a sectional view of the drive/motor end-cap as shown in FIG. 1.
FIG. 6 is an alternative embodiment of the drive/motor end-cap wherein the motor engages the positioning screw at a ninety degree angle.
FIG. 7 is a cross-sectional view of the shaft/bearing end cap as shown in FIG. 1.
FIG. 8 is a side sectional view of the ball receptacle assembly and roller guide within the main housing unit.

The end cap 8 as shown in FIG. 5 forms a sealed housing for a drive motor 50 and linkage assembly which drive the positioning screw 10. The drive motor 50 lies on the same axis as the positioning screw 10, or alternatively may be offset ninety degrees relative to the positioning screw 10 as shown in FIG. 6. An existing fractional horsepower parallel shaft 12 VDC electric motor provides adequate power for the unit. Alternatively, the motor may be hydraulically powered with flexible hydraulic fluid lines linking a control panel within the cab to the drive motor. The linkage assembly comprises a set of carbon steel ratio gears 54 directly connected to the drive motor 50 and positioning screw 10. A shaft 52 extends from the positioning screw 10 from the central chamber 4 into the end cap 8. The shaft 52 is circumscribed by a bronze bushing 56 at the junction of the central chamber 4 and end cap 8. A bronze thrust washer 58 and rubber screw seal 59 circumscribe the positioning screw 10 at its juncture with the shaft 52 inside the central chamber 4.

FIG. 7 shows the contents of the opposite end cap 6, which forms a seal around the shaft 72 of the positioning screw 10. The shaft 72 extends into the end cap 6 from the central chamber 4. The shaft is circumscribed by a bronze bushing 76 at the junction of the central chamber 4 and end cap 6. A bronze thrust washer 78 and rubber screw seal 79 circumscribe the positioning screw 10 at its juncture with the shaft 72 inside the central chamber 4.

The wireless remote control device 13 of FIG. 1 enables the operator to actuate the drive motor 50. Wireless remote control device 13 may be, for example, a conventional VHF or infrared transmitter matched to a corresponding receiver which controls the application and polarity of voltage applied to drive motor 50. There are a variety of commercially available matched pair transmitters/receivers that are well-suited to this purpose. The remote 13 may be operated from within the cab of the tow vehicle or from outside. The remote 13 preferably comprises a setting to center the ball receptacle assembly 12, plus right and left directional buttons. When a "L" or "R" directional button is depressed, the locking pin 34 in the center position lock assembly 16 is retracted and the motor is energized. Activation of the drive motor 50 causes the positioning screw 10 to rotate either clockwise or counter clockwise depending on the input from the operator at the remote control. Rotation of the positioning screw 10 moves the roller guide 14 laterally along the internal track 15 of the central chamber of the housing structure, thereby effecting lateral movement of the trailer hitch tongue. The system is effective for simplifying the hook-up process between a tow vehicle and a trailer and can be used while moving at slow speeds to improve maneuverability of the vehicle/trailer tandem.

The system as described herein is preferably powered by the existing automotive 12-volt electrical system. Alternatively, as mentioned previously a hydraulic system can be used to achieve lateral movement of the trailer hitch assembly. The positioning screw 10, roller guides 14, and thrust washers 78 are preferably stainless steel to prevent corrosion.

With all parts assembled as shown in FIG. 2, the trailer hitch 2 is mounted in conventional manner to the rear of a tow vehicle. A trailer hitch tongue (not shown) extends from the ball receptacle assembly 12 rearwardly toward the trailer. The ball receptacle assembly 12 projects downwardly through the slot 92 in the central housing structure, and attaches to the roller guide 14 within the central chamber 4. The roller guide 14 is capable of moving laterally inside the central chamber 4 along the track 15 incorporated therein. Accordingly, any movement of the roller guide 14 is translated into movement of the ball receptacle assembly 12 and hitch tongue.

The above-described trailer hitch assembly 2 provides wide-field lateral adjustment of the ball receptacle assembly of a trailer hitch by linking said ball receptacle assembly to a worm-gear type positioning screw driven by an electric motor. The assembly of reduction (ratio) gears ensures precise left, right, or center adjustment, and the adjustment can conveniently controlled by the wireless remote control device 13 from either the cab or rear of the vehicle. Moreover, all of the operative parts (positioning screw, electric motor, remote sensing unit, and all other internal operating components) are protected in a sealed housing. This increases the useful life of the trailer hitch and offers a compact, clean design to satisfy appearance-conscious consumers.

Figure 10:
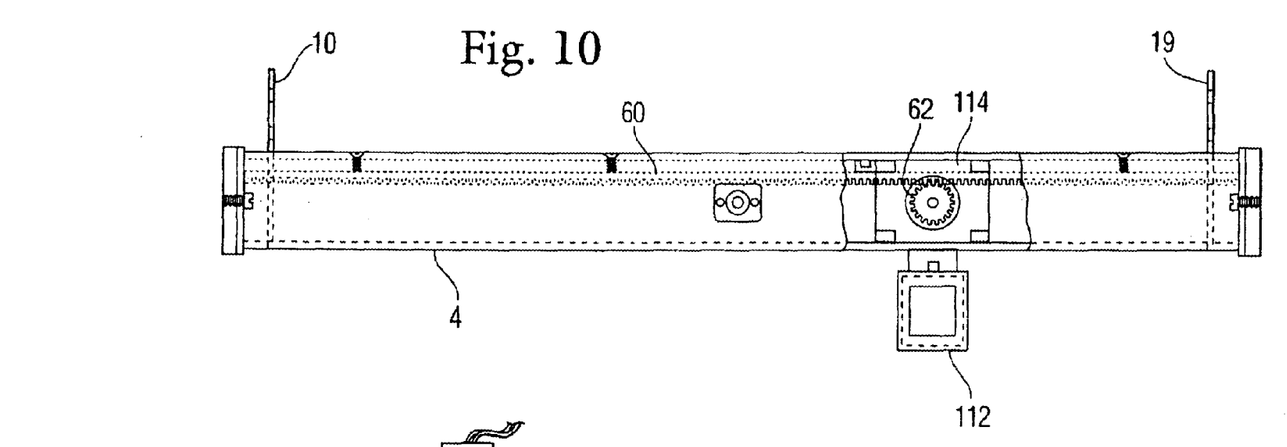
FIG. 10 is a side cross-sectional view of an alternate embodiment of the ball receptacle assembly and roller guide incorporating adaptations which make them compatible with a rack and pinion mechanism.
Figure 11:
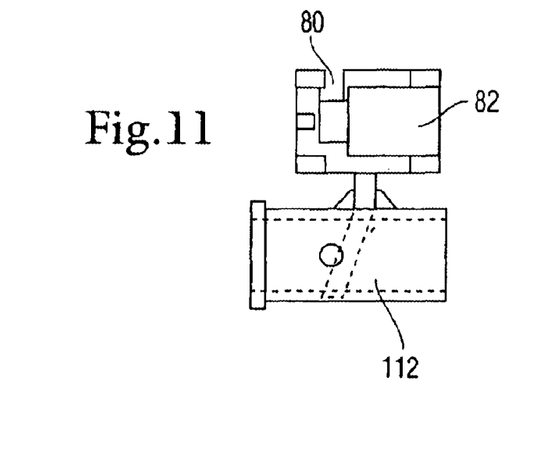
FIG. 11 is a side sectional view of the ball receptacle assembly and roller guide of the alternative embodiment within the main housing unit.

FIGS. 10–11 show an alternative embodiment of the trailer hitch wherein a rack and pinion mechanism, instead of the positioning screw 10, directs the movement of the roller guide 114. As best seen in FIG. 10, a rack gear 60 is horizontally disposed within the central housing 4. As in the previous embodiment, the ball receptacle assembly 12 mounts to a modified roller guide 114 and projects downwardly through a slotted opening on the downward face of the central housing. In this case, the roller guide 114 is adapted to mate with the rack gear 60. Accordingly, the roller guide 114 is generally formed in the shape of a block conforming to the width and height dimensions of the interior of the central chamber 4. The top surface of the roller guide 114 is defined by a toothed channel 80 as shown in FIG. 11, in which it receives the rack gear 60. The roller guide 114 further comprises an integral electric drive motor 82 connected externally to a circular toothed gear 62 which meshes with the rack gear 60. In operation, the electric motor 82 powers the circular gear 62. Movement of the circular gear 62 along the rack gear 60 causes the roller guide 114 to move laterally left or right. Lateral movement of the roller guide translates into a corresponding lateral movement of the ball receptacle assembly 12 and hitch tongue as in the previous embodiment.

Figure 12:
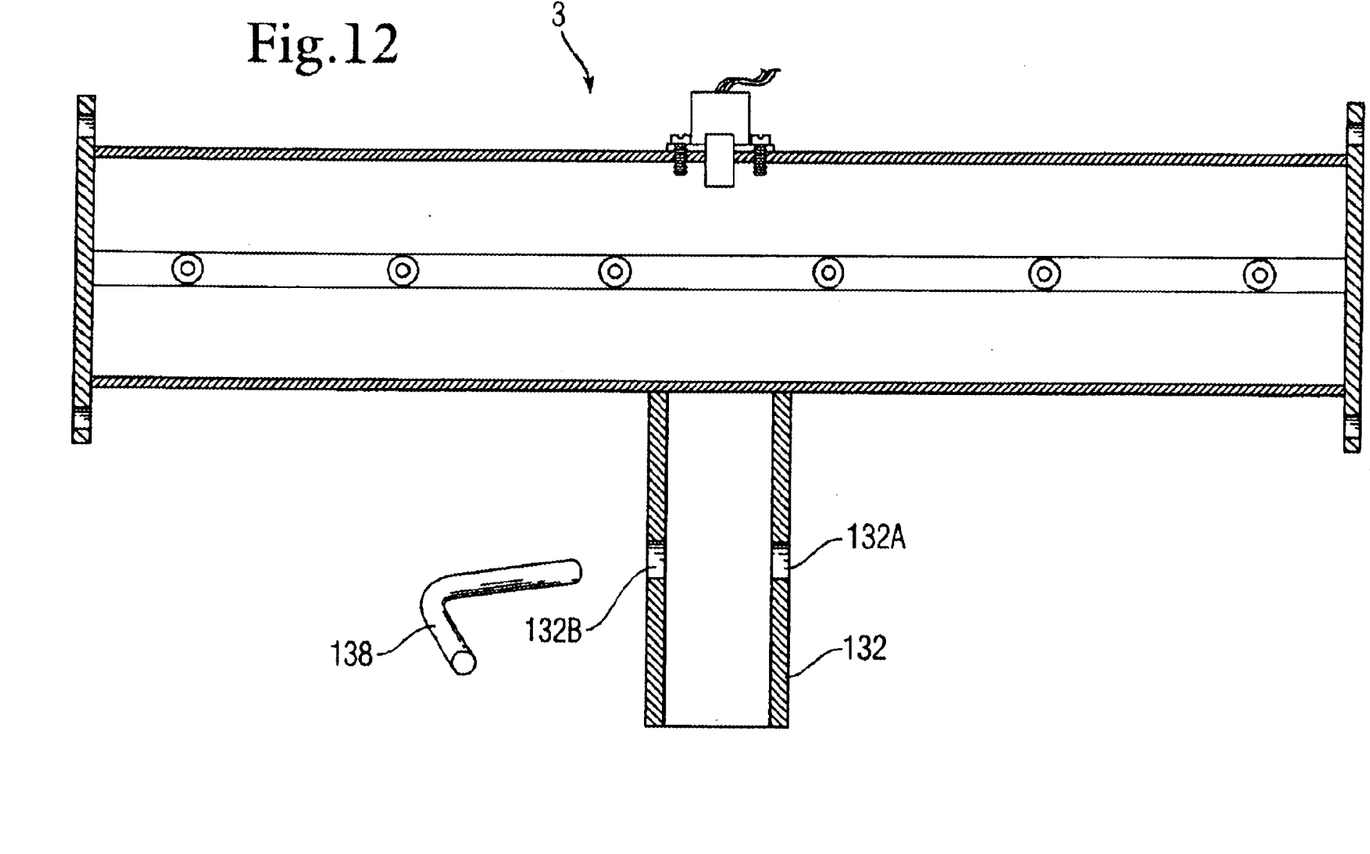
FIG. 12 is a top plan view of an alternative embodiment which comprises a stud for mounting to the support component of a class "A" trailer hitch.
Figure 13:
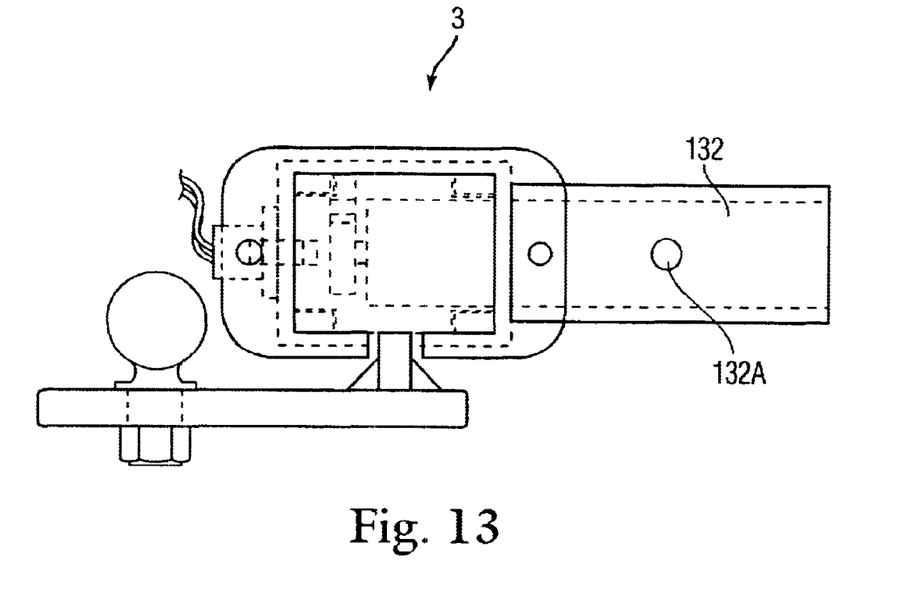
FIG. 13 is a side sectional view of the alternative embodiment comprising a stud for mounting to the support component of a class "A" trailer hitch.
Figure 14:
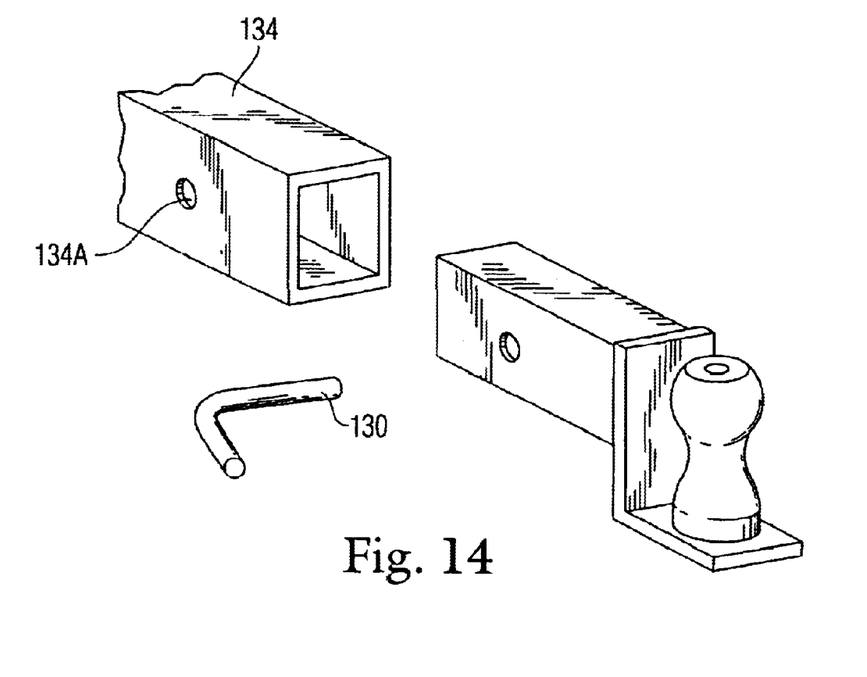
FIG. 14 is an isometric view of the components of a class "A" trailer hitch.

FIG. 14 illustrates a conventional class "A" trailer hitch. As further shown in FIGS. 12–13, the apparatus of the present invention can easily be adapted to accommodate such a standard class "A" trailer hitch with telescoping support component 134. Either of the above-described embodiments may be adapted for class "A" trailer hitch by replacing the mounting brackets 18 and 19 of FIGS. 2 and 11 with a stud portion 132 centrally located on the front face of the housing 3 (see FIG. 12). With combined reference to FIGS. 12 and 13, stud portion 132 is a generally rectangular shaped, hollow projection which extends forwardly from the hitch toward the tow vehicle, and telescopes inside of the support component 134 of the class "A" trailer hitch. The stud portion 132 is defined by holes 132a and 132b on opposite vertical sides, which correspond to holes 134a (visible in FIG. 14 and 134b (obscured) found on opposing sides of support component 134. A through bolt 138 engages holes 134a, 132a, 132b, and 134b and secures the stud portion 132 within the support component 134. In this manner, the hitch is easily coupled to and disengaged from a class "A" hitch mounted on the tow vehicle. This allows the user to mount the hitch to the rear of a towing vehicle by means of mounting brackets adaptable for use on a range of different tow vehicles.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims:

We claim:

1. An adjustable trailer hitch assembly comprising:

an elongate substantially enclosed housing defining an internal chamber, the housing being interrupted by a lengthwise slot;

a guide carriage movably seated and fully enclosed within the chamber of said housing, said guide carriage further comprising at least eight rollers bearing against opposing sides of said chamber for lateral movement within said enclosed housing;

a hitch assembly external to said enclosed housing and attached to said guide carriage through said lengthwise slot;

a positioning screw rotatably seated lengthwise inside said enclosed housing and operatively coupled to said guide carriage for laterally driving said guide carriage along the internal chamber; and a drive motor for turning said positioning screw;

whereby selective actuation of said drive motor causes said positioning screw to rotate, thereby moving said roller guide laterally left or right and carrying said ball receptacle assembly therewith.

2. The adjustable trailer hitch of claim 1, wherein said hitch assembly further comprises a ball receptacle assembly including a socket for receiving a trailer hitch tongue, said ball receptacle assembly being attached to said guide carriage and projecting downwardly through said slot in said housing structure.

3. The adjustable trailer hitch of claim 1, wherein said housing structure comprises a central chamber having a sealed end cap at each end, said central chamber being defined by said lengthwise slot.

4. The adjustable trailer hitch of claim 1, wherein said housing further comprises an internal track along which said guide carriage moves.

5. The adjustable trailer hitch of claim, 4, wherein said guide carriage further comprises a carriage body and said at least eight rollers further comprise stainless steel wheels mounted at the corners of said carriage body.

6. The adjustable trailer hitch of claim 5, wherein said carriage body is formed with a cross-shaped cross-section.

7. The adjustable trailer hitch of claim 6, wherein said positioning screw is a threaded worm gear.

8. The adjustable trailer hitch of claim 7, wherein said guide carriage is formed with a passage for traversal of said positioning screw.

9. The adjustable trailer hitch of claim 8, wherein said guide carriage is formed with internal threads along said passage for engaging the threads of said positioning screw.

10. The adjustable trailer hitch of claim 7, wherein each end of said positioning screw is seated in one of said end caps, and said positioning screw is connected to said drive motor via a linking assembly.

11. The adjustable trailer hitch of claim 10, wherein said linking assembly comprises a thrust washer, screw seal, screw bushing, and ratio gears.

12. The adjustable trailer hitch of claim 11, wherein said linking assembly further comprises a shaft set-screwed to said drive motor at one end and set-screwed to said positioning screw at the opposite end, said shaft further comprising interlocking gear teeth on its each end, whereby said shaft engages said drive motor at one end and engages said positioning screw at the opposite end.

13. The adjustable trailer hitch of claim 1, wherein said drive motor comprises a 12-volt electric motor housed within an end cap of said housing.

14. The adjustable trailer hitch of claim 1, further comprising a remote control for remotely and selectively actuating said drive motor to rotate in either direction.

15. The adjustable trailer hitch of claim 1, wherein said hitch assembly further comprises a trailer hitch tongue with distal ball, said trailer hitch tongue being attached to said guide carriage through said slot in said housing.

16. The adjustable trailer hitch of claim 1, wherein said hitch assembly further comprises a receptacle for receiving a trailer hitch tongue, said receptacle being attached to said guide carriage through said slot in said housing.

17. The adjustable trailer hitch of claim 1, whereby said hitch assembly telescopes with the support component of a standard class "A" trailer hitch mounted to the tow vehicle.

* * * * *